(12) United States Patent
Wang et al.

(10) Patent No.: US 11,317,404 B2
(45) Date of Patent: Apr. 26, 2022

(54) DATA TRANSMISSION METHOD, RELATED DEVICE, AND SYSTEM

(71) Applicant: HUAWEI TECHNOLOGIES CO., LTD., Guangdong (CN)

(72) Inventors: Chao Wang, Shanghai (CN); Yiqun Wu, Shanghai (CN); Yan Chen, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 184 days.

(21) Appl. No.: 16/748,616

(22) Filed: Jan. 21, 2020

(65) Prior Publication Data

US 2020/0154423 A1    May 14, 2020

Related U.S. Application Data

(63) Continuation of application No. PCT/CN2018/098608, filed on Aug. 3, 2018.

(30) Foreign Application Priority Data

Aug. 4, 2017    (CN) .......................... 201710664220.8

(51) Int. Cl.
 *H04W 4/00* (2018.01)
 *H04W 72/04* (2009.01)
 (Continued)

(52) U.S. Cl.
 CPC ............ *H04W 72/044* (2013.01); *H04B 1/69* (2013.01); *H04L 1/0071* (2013.01); *H04W 72/12* (2013.01); *H04W 76/10* (2018.02)

(58) Field of Classification Search
 CPC ............. H04W 72/0446; H04W 88/08; H04W 72/0453; H04W 24/00; H04W 72/044;
 (Continued)

(56) References Cited

U.S. PATENT DOCUMENTS 8,249,006 B2 * 8/2012 Qu ...................... H04J 13/0062
370/329
8,619,633 B2 * 12/2013 Cheng ............... H04W 72/0413
370/255
(Continued)

FOREIGN PATENT DOCUMENTS

CN    102026277 A    4/2011
CN    101473585 B    7/2013
(Continued)

*Primary Examiner* — Phuongchau Ba Nguyen
(74) *Attorney, Agent, or Firm* — Womble Bond Dickinson (US) LLP

(57) ABSTRACT

Embodiments of the present invention describe a data transmission method, a related device, and a system. The method may include sending, by a terminal, uplink data to a network device. The uplink data is scrambled by using a scrambling sequence, and the scrambling sequence is generated based on information about a radio resource used by the terminal to send the uplink data. According to the embodiments of the present invention, it can be ensured that scrambling and descrambling on the uplink data are successfully implemented when the network device does not obtain an identifier of the terminal in a cell.

17 Claims, 3 Drawing Sheets

(51) Int. Cl.
*H04B 1/69* (2011.01)
*H04L 1/00* (2006.01)
*H04W 76/10* (2018.01)
*H04W 72/12* (2009.01)

(58) Field of Classification Search
CPC ..... H04W 76/10; H04W 72/12; H04W 72/04; H04W 74/08; H04L 5/0007; H04L 1/0071; H04L 5/0053; H04L 1/0047; H04L 25/03866; H04L 1/0042; H04B 1/69; H04J 13/0051; H04J 13/10
See application file for complete search history.

(56) References Cited

U.S. PATENT DOCUMENTS

| | | | |
|---|---|---|---|
| 8,923,905 B2 * | 12/2014 | Montojo | H04B 7/024 |
| | | | 455/507 |
| 9,294,245 B2 * | 3/2016 | Qu | H04L 5/0062 |
| 9,306,712 B2 * | 4/2016 | Zhang | H04L 25/0226 |
| 9,398,617 B2 * | 7/2016 | Guo | H04J 13/0062 |
| 10,333,671 B2 * | 6/2019 | Seo | H04L 27/26 |
| 10,973,020 B2 * | 4/2021 | Wang | H04W 72/044 |
| 2008/0019314 A1 * | 1/2008 | Gorokhov | H04L 25/03866 |
| | | | 370/330 |
| 2009/0041240 A1 * | 2/2009 | Parkvall | H04W 74/004 |
| | | | 380/247 |
| 2011/0237267 A1 * | 9/2011 | Chen | H04J 13/10 |
| | | | 455/450 |
| 2014/0328256 A1 | 11/2014 | Djukic et al. | |
| 2015/0146668 A1 * | 5/2015 | Liu | H04L 27/2613 |
| | | | 370/329 |
| 2016/0366717 A1 * | 12/2016 | Yang | H04W 72/0406 |
| 2016/0374037 A1 * | 12/2016 | Lee | H04J 13/0003 |
| 2017/0048014 A1 * | 2/2017 | Lampinen | H04J 13/10 |
| 2018/0041857 A1 * | 2/2018 | Ouchi | H04W 8/24 |
| 2019/0261442 A1 * | 8/2019 | Yoon | H04W 56/001 |
| 2019/0327030 A1 | 10/2019 | Yoshimoto et al. | |
| 2019/0349918 A1 | 11/2019 | Nayeb Nazar et al. | |

FOREIGN PATENT DOCUMENTS

| | | |
|---|---|---|
| CN | 103260250 A | 8/2013 |
| CN | 105245309 A | 1/2016 |
| CN | 106470468 A | 3/2017 |
| CN | 103748859 B | 4/2017 |
| CN | 106788943 A | 5/2017 |
| KR | 20120093912 A | 8/2012 |
| WO | 2009020423 A1 | 2/2009 |

* cited by examiner

DATA TRANSMISSION METHOD, RELATED DEVICE, AND SYSTEM

CROSS-REFERENCE TO RELATED APPLICATIONS

This application is a continuation of International Application No. PCT/CN2018/098608, filed on Aug. 3, 2018, which claims priority to Chinese Patent Application No. 201710664220.8, filed on Aug. 4, 2017. The disclosures of the aforementioned applications are hereby incorporated by reference in their entireties.

TECHNICAL FIELD

The present disclosure relates to the field of communications technologies, and in particular, to a data transmission method, a related device, and a system.

BACKGROUND

In a wireless cellular network (for example, long term evolution (LTE)), before sending uplink data, a terminal needs to first establish a radio resource control (RRC) connection to a base station, and then send a scheduling request (SR) to the base station when the radio resource control connection is established. If the base station allows the terminal to send the uplink data, the base station sends a scheduling instruction to the terminal, and finally the terminal sends the uplink data to the base station on a time-frequency resource indicated by the scheduling instruction. Such a transmission procedure may be referred to as scheduling transmission. The scheduling transmission has the following two disadvantages. First, a relatively large delay is incurred. The delay is specifically from a time when the terminal determines that there is uplink data to be sent to a time when the terminal sends the uplink data through an air interface. Second, when a large quantity of terminals need to send uplink data in a time period, a large quantity of uplink and downlink control channel resources are consumed to send scheduling requests and scheduling signaling, and there are a relative large quantity of network overheads (for example, power and air interface resources are wasted). In scheduling transmission, the base station may exchange a scheduling request and scheduling signaling with a terminal, to learn of a cell radio network temporary identifier (C-RNTI) related to the terminal, and the terminal uses information such as the C-RNTI related to the terminal to scramble uplink data that needs to be sent, to randomize a signal. In this way, interference in a neighboring cell is reduced. After receiving the scrambled data, the base station also uses the information such as the C-RNTI related to the terminal to descramble the received data, to parse out the uplink data that needs to be sent by the terminal.

Massive machine-type communication (mMTC) is one of three determined application scenarios of the fifth-generation mobile communications technology (5G). In this scenario, there are a huge quantity of terminals, and a service type of the terminals is mainly a small data packet service and has a specified requirement on a delay. In this scenario, scheduling-free transmission (e.g., Grant-Free Transmission) is considered as an uplink data transmission method better than the scheduling transmission. An idea of the scheduling-free transmission is that uplink data may come and go without a scheduling request and a scheduling instruction. More specifically, when determining that there is uplink data that needs to be sent, a terminal does not send an uplink scheduling request to a base station and does not need to receive a scheduling instruction sent by the base station, but directly processes the uplink data and then sends the uplink data to the base station. Because no scheduling request or scheduling instruction is exchanged between the terminal and the base station, after receiving uplink data sent by a terminal, the base station does not know the terminal from which the uplink data comes. Therefore, the terminal cannot scramble the transmitted uplink data by using a C-RNTI related to the terminal and the base station cannot descramble the transmitted uplink data by using the C-RNTI related to the terminal. In a scheduling-free transmission scenario, how to scramble and descramble transmitted uplink data is a technical problem that confronts persons skilled in the art.

SUMMARY

Embodiments of the present invention provide a data transmission method, a related device, and a system, to ensure that scrambling and descrambling on uplink data are successfully implemented when a network device does not obtain an identifier of the terminal in a cell.

According to a first aspect, an embodiment of the present invention provides a data transmission method, and the method includes: sending, by a terminal, uplink data to a network device. The uplink data is scrambled by using a scrambling sequence, and the scrambling sequence is generated based on information about a radio resource used by the terminal to send the uplink data.

According to a second aspect, an embodiment of the present invention provides a data transmission method, and the method includes: receiving, by a network device, uplink data sent by a terminal. The uplink data is scrambled by using a scrambling sequence, and the scrambling sequence is generated based on information about a radio resource used by the terminal to send the uplink data.

According to a third aspect, an embodiment of the present invention provides a terminal, and the terminal includes a memory, a transceiver, and at least one processor. The memory stores an instruction, and the memory, the transceiver, and the at least one processor are interconnected by using a line. The transceiver is configured to send uplink data to a network device, or the processor is configured to invoke the instruction to control the transceiver to send the uplink data to the network device. The uplink data is scrambled by using a scrambling sequence, and the scrambling sequence is generated based on information about a radio resource used by the terminal to send the uplink data.

According to a fourth aspect, an embodiment of the present invention provides a network device, and the network device includes a memory, a transceiver, and at least one processor. The memory stores an instruction, and the memory, the transceiver, and the at least one processor are interconnected by using a line. The transceiver is configured to receive uplink data sent by a terminal, or the processor is configured to invoke the instruction to control the transceiver to receive the uplink data sent by the terminal. The uplink data is scrambled by using a scrambling sequence, and the scrambling sequence is generated based on information about a radio resource used by the network device to send the uplink data.

According to a fifth aspect, an embodiment of the present invention provides a terminal, and the terminal includes a sending unit. The sending unit is configured to send uplink data to a network device. The uplink data is scrambled by using a scrambling sequence, and the scrambling sequence is generated based on information about a radio resource used by the terminal to send the uplink data.

According to a sixth aspect, an embodiment of the present invention provides a network device, and the network device includes a receiving unit. The receiving unit is configured to receive uplink data sent by a terminal. The uplink data is scrambled by using a scrambling sequence, and the scrambling sequence is generated based on information about a radio resource used by the terminal to send the uplink data.

According to a seventh aspect, an embodiment of the present invention provides a chip system. The chip system includes at least one processor, a memory, and an interface circuit. The memory, the transceiver, and the at least one processor are interconnected by using a line. The at least one memory stores an instruction, and when the instruction is executed by the processor, a terminal including the chip system sends uplink data to a network device. The uplink data is scrambled by using a scrambling sequence, and the scrambling sequence is generated based on information about a radio resource used by the terminal to send the uplink data.

According to an eighth aspect, an embodiment of the present invention provides a chip system. The chip system includes at least one processor, a memory, and an interface circuit. The memory, the transceiver, and the at least one processor are interconnected by using a line. The at least one memory stores an instruction, and when the instruction is executed by the processor, a network device including the chip system receives uplink data sent by a terminal. The uplink data is scrambled by using a scrambling sequence, and the scrambling sequence is generated based on information about a radio resource used by the terminal to send the uplink data.

According to a ninth aspect, an embodiment of the present invention provides a computer readable storage medium. The computer readable storage medium stores an instruction, and when the instruction is run on a terminal, the terminal sends uplink data to a network device. The uplink data is scrambled by using a scrambling sequence, and the scrambling sequence is generated based on information about a radio resource used by the terminal to send the uplink data.

According to a tenth aspect, an embodiment of the present invention provides a computer readable storage medium. The computer readable storage medium stores an instruction, and when the instruction is run on a network device, the network device receives uplink data sent by a terminal. The uplink data is scrambled by using a scrambling sequence, and the scrambling sequence is generated based on information about a radio resource used by the terminal to send the uplink data.

According to an eleventh aspect, an embodiment of the present invention provides a computer program product, and when the computer program product is run on a terminal, the terminal sends uplink data to a network device. The uplink data is scrambled by using a scrambling sequence, and the scrambling sequence is generated based on information about a radio resource used by the terminal to send the uplink data.

According to a twelfth aspect, an embodiment of the present invention provides a computer program product, and when the computer program product is run on a network device, the network device receives uplink data sent by a terminal. The uplink data is scrambled by using a scrambling sequence, and the scrambling sequence is generated based on information about a radio resource used by the terminal to send the uplink data.

According to a thirteenth aspect, an embodiment of the present invention provides a communications system, and the communications system includes a network device and a terminal. The terminal is the terminal described in the third aspect or the fifth aspect, and the network device is the network device described in the fourth aspect or the sixth aspect.

In the aspects described above, the scrambling sequence used by the terminal to scramble the uplink data is generated by the terminal based on the radio resource used to send the uplink data, and the network device may also detect the radio resource when receiving the uplink data. Therefore, the network device may also generate, based on the radio resource, a descrambling sequence used to descramble the uplink data. According to this method, it can be ensured that when the network device does not obtain an identifier of the terminal in a cell, the terminal can still scramble the uplink data, and the scrambled uplink data can still be successfully descrambled by the network device.

With reference to any one of the foregoing aspects, in a possible embodiment, the radio resource includes at least one of a time-frequency resource used to send the uplink data, a frequency domain of the time-frequency resource, a pilot used to send the uplink data, a spread spectrum sequence used to send the uplink data, and an interleaving pattern used to send the uplink data.

With reference to any one of the foregoing aspects or any one of the foregoing possible embodiments, in another possible embodiment, the radio resource includes the time-frequency resource, or the radio resource includes the pilot, or the radio resource includes the frequency domain of the time-frequency resource and the pilot, or the radio resource includes the frequency domain of the time-frequency resource and the spread spectrum sequence, or the radio resource includes the frequency domain of the time-frequency resource and the interleaving pattern.

With reference to any one of the foregoing aspects or any one of the possible embodiments, in still another possible embodiment, when the radio resource includes the pilot, an initial sequence generation value $C_{init}$ of the scrambling sequence meets a formula 1, a formula 2, or a formula 3.

$$c_{init}=n_{RS}\cdot 2^{13}+\lfloor n_s/2 \rfloor \cdot 2^9+N_{ID}^{cell} \qquad \text{Formula 1:}$$

$$c_{init}=n_{RS}\cdot 2^{14}+q\cdot 2^{13}+\lfloor (j_0+j)N_{acc} \bmod 10 \rfloor \cdot 2^9+N_{ID}^{cell} \qquad \text{Formula 2:}$$

$$c_{init}=(\lfloor n_s/2 \rfloor+1)\cdot(2N_{ID}^{cell}+1)2^x+n_{RS} \qquad \text{Formula 3:}$$

In the formula 1, the formula 2, and the formula 3, $n_{RS}$ is an identifier of the pilot, q is determined based on a quantity of code words in a subframe, $n_s$ is a quantity of timeslots in a frame, $N_{ID}^{cell}$ is an identifier of a cell in which the terminal is located, $j_0=\lfloor i_0/N_{acc} \rfloor$, $i_0$ is a subframe sequence number obtained through counting from a first PUSCH subframe to a subframe used for current data transmission, $N_{acc}$ is a preset value indicating a quantity of subframes, j represents a sequence number of a code block in $N_{acc}$ subframes that needs to be scrambled currently, and x is determined based on a quantity of bits occupied by a number $n_{RS}$ of the pilot.

With reference to any one of the foregoing aspects or any one of the possible embodiments, in still another possible embodiment, when the radio resource includes the frequency domain of the time-frequency resource and the pilot, an initial sequence generation value $C_{init}$ of the scrambling sequence meets a formula 4, a formula 5, or a formula 6.

$$c_{init}=n_{Feq}\cdot 2^x+n_{RS}\cdot 2^{13}+\lfloor n_s/2 \rfloor \cdot 2^9+N_{ID}^{cell} \qquad \text{Formula 4:}$$

$$c_{init}=n_{Feq}\cdot 2^x+n_{RS}\cdot 2^{14}+q\cdot 2^{13}+\lfloor (j+j)N_{acc} \bmod 10\rfloor \cdot 2^9+N_{ID}^{cell} \quad \text{Formula 5:}$$

$$c_{init}=(\lfloor n_s/2\rfloor+1)\cdot(2N_{ID}^{cell}+1)2^y+n_{Feq}2^x+n_{RS} \quad \text{Formula 6:}$$

In the formula 4, the formula 5, and the formula 6, $n_{Feq}$ is an identifier of the frequency domain, $n_{RS}$ is a number of the pilot, q is determined based on a quantity of code words in a subframe, $n_s$ is a quantity of timeslots in a frame, $N_{ID}^{cell}$ is an identifier of a cell in which the terminal is located, $j_0=\lfloor i_0/N_{acc}\rfloor$, $i_0$ is a subframe sequence number obtained through counting from a first PUSCH subframe to a subframe used for current data transmission, $N_{acc}$ is a preset value indicating a quantity of subframes, j represents a sequence number of a code block in $N_{acc}$ subframes that needs to be scrambled currently, x is determined based on a quantity of bits occupied by the number $n_{RS}$ of the pilot, and y is determined based on x and a quantity of bits occupied by the identifier $n_{Feq}$ of the frequency domain.

With reference to any one of the foregoing aspects or any one of the foregoing possible embodiments, in still another possible embodiment, the time-frequency resource used to send the uplink data does not need to be instantly scheduled by the network device. To be specific, the time-frequency resource used to send the uplink data does not need to be instantly scheduled by the network device. Therefore, the time-frequency resource may be considered as a grant-free time-frequency resource. In this way, not only uplink data transmission efficiency can be improved, but also scrambling and descrambling on the uplink data can be successfully implemented.

With reference to any one of the foregoing aspects or any one of the possible embodiments, in still another possible embodiment, the time-frequency resource used to send the uplink data is selected by the terminal from a plurality of to-be-selected time-frequency resources according to a preset rule, or preconfigured by the network device for the terminal by using a signaling message.

In the embodiments of the present invention, the scrambling sequence used by the terminal to scramble the uplink data is generated by the terminal based on the radio resource used to send the uplink data, and the network device may also detect the radio resource when receiving the uplink data. Therefore, the network device may also generate, based on the radio resource, a descrambling sequence used to descramble the uplink data. According to this method, it can be ensured that when the network device does not obtain an identifier of the terminal in a cell, the terminal can still scramble the uplink data, and the scrambled uplink data can still be successfully descrambled by the network device.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The embodiments of the present invention are described in the following with reference to the accompanying drawings in the embodiments of the present invention.

Figure 1:
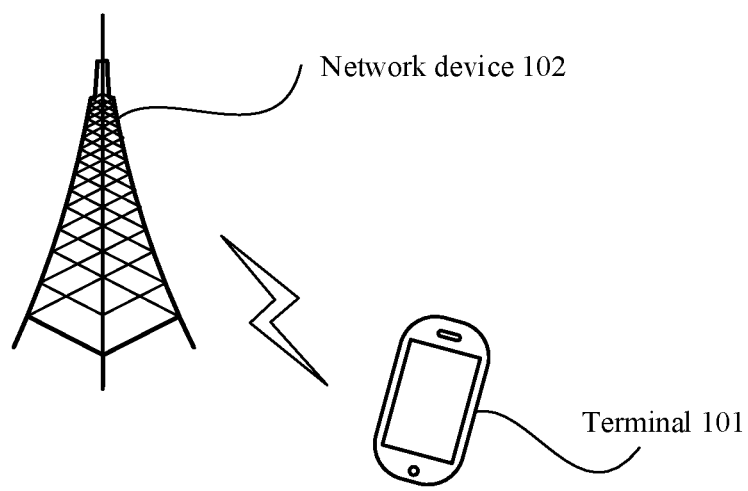
FIG. 1 is a schematic structural diagram of a communications system according to an embodiment of the present invention.

FIG. 1 is a schematic structural diagram of a communications system according to an embodiment of the present invention. The communications system includes a terminal 101 and a network device 102, and may further include another device. Optionally, a device in the communications system 10 may communicate by using a wireless communications technology. For example, the wireless communications technology may be the second-generation mobile communications technology (2G), the third-generation mobile communications technology (3G), LTE, the fourth-generation mobile communications technology (4G), the fifth-generation mobile communications technology (5G), a wireless fidelity (WI-FI) technology, another existing communications technology, or a subsequently developed communications technology. The terminal 101 may be a handheld device having a wireless communication function (such as a mobile phone, a tablet computer, or a palmtop computer), a vehicle-mounted device (such as a car, a bicycle, an electric vehicle, an airplane, or a ship), a wearable device (such as a smartwatch (for example, an iWatch™), a smart band, and a pedometer), a smart home device (such as a refrigerator, a television, an air conditioner, and an electricity meter), a smart robot, a workshop device, another processing device that can be connected to a wireless modem, and various forms of user equipment (UE), a mobile station (MS), a terminal, a terminal device (or terminal equipment), and the like. The network device 102 may be a device on a network side such as a base station. In the embodiments of the present invention, how to obtain a scrambling sequence used by the terminal 101 in the communications system to scramble uplink data is described in greater detail herein.

Figure 2:
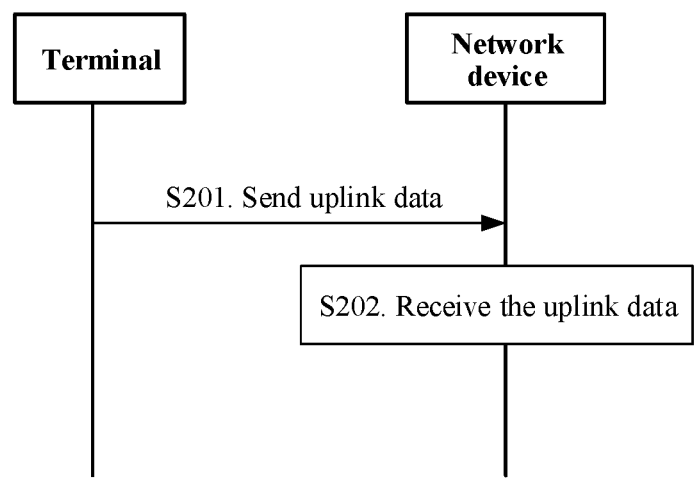
FIG. 2 is a schematic flowchart of a data transmission method according to an embodiment of the present invention.

FIG. 2 is a schematic flowchart of a data transmission method according to an embodiment of the present invention. The method may be implemented based on the communications system shown in FIG. 1, and the method includes but is not limited to the following steps.

Step S201: A terminal sends uplink data to a network device.

Specifically, the uplink data is scrambled by using a scrambling sequence, and the scrambling sequence is generated based on information about a radio resource used by the terminal to send the uplink data. Currently, a person skilled in the art is studying a transmission scheme based on a contention transmission unit (CTU). The network device defines one or more CTUs for each managed cell. Each CTU includes one or more multiple access resources (MAR), and one MAR includes a multiple access physical resource (MAPR) and a multiple access signature (MAS). Optionally, the target time-frequency resource may be the multiple access resource MAR described herein. Certainly, the target time-frequency resource may alternatively be a time-frequency resource in another form. In this embodiment of this application, before sending the uplink data, the terminal first determines a time-frequency resource used to send the uplink data. The time-frequency resource, determined by the terminal, used to send the uplink data, may be referred to as a target time-frequency resource for ease of subsequent description. Optionally, the target time-frequency resource needs to be instantly scheduled by the network device. Optionally, the target time-frequency resource does not need to be instantly scheduled by the network device.

Optionally, when the target time-frequency resource does not need to be instantly scheduled by the network device, the terminal needs to determine the target time-frequency resource in another manner. Optionally, the terminal may randomly select a time-frequency resource from a plurality of preset time-frequency resources as the target time-frequency resource. Alternatively, the terminal may select a time-frequency resource from a plurality of preset time-frequency resources as the target time-frequency resource according to a preset rule. Specific content included in the preset rule is not limited herein (for example, the preset rule may define information such as an algorithm used during selection or a factor that needs to be considered). Alternatively, the target time-frequency resource may be preconfigured for the terminal to transmit the uplink data. For example, the network device or another device uses signaling to preconfigure the target time-frequency resource (not configured when there is uplink data to be transmitted) for the terminal.

It may be understood that the target time-frequency resource is a radio resource used by the terminal to send the uplink data, time domain occupied by the target time-frequency resource is also a radio resource used by the terminal to send the uplink data, and frequency domain occupied by the target time-frequency resource is also a radio resource used by the terminal to send the uplink data. In this embodiment of this application, the terminal may further use a pilot to send the uplink data, and when the pilot is used, the used pilot is also a radio resource used by the terminal to send the uplink data. The terminal may further use a spread spectrum sequence to send the uplink data, and when the spread spectrum sequence is used, the used spread spectrum sequence is also a radio resource used by the terminal to send the uplink data. The terminal may further use an interleaving pattern to send the uplink data, and when the interleaving pattern is used, the used interleaving pattern is also a radio resource used by the terminal to send the uplink data.

After determining the radio resource used by the terminal to send the uplink data, the terminal generates the scrambling sequence based on the radio resource. The terminal generates the scrambling sequence based on at least one of radio resources used by the terminal. For example, the terminal uses a target time-frequency resource, a pilot, a spread spectrum sequence, and an interleaving pattern to send the uplink data. In this case, the terminal generates the scrambling sequence based on at least one of a to-be-used target time-frequency resource, frequency domain of the target time-frequency resource, time domain of the target time-frequency resource, the pilot, the spread spectrum sequence, and the interleaving pattern. It may be understood that if the terminal does not need to use spectrum spreading to send the uplink data, the spectrum spreading is not used during calculation of the scrambling sequence. If the terminal does not need to use the interleaving pattern to send the uplink data, the interleaving pattern is not used during the calculation of the scrambling sequence, and so on. For ease of understanding, several possible schemes are exemplified in the following description.

Scheme 1: The scrambling sequence is generated based on the target time-frequency resource, and when the scrambling sequence is calculated, information about the target time-frequency resource is used. In this embodiment of the present invention, the one time-frequency resource and one signature may constitute one multiple access resource, and multiple access resource that includes the target time-frequency resource used to send the uplink data and a signature used to send the uplink data may be referred to as a target multiple access resource. The target multiple access resource is only some of a plurality of predetermined multiple access resources, and each of the plurality of multiple access resources has respective identifier (or number). Identifiers of any two of the multiple access resources are different. Identifiers of the plurality of multiple access resources are divided in a plurality of manners, and only one of the optional division manners is used herein as an example. Details are as follows: It is assumed that there may be S signatures such as $s_1, s_2, K\ s_{S_n}$, on the $n^{th}$ time-frequency resource in N time-frequency resources, where $1 \le n \le N$. In this case, the N time-frequency resources include $\Sigma_{n=1}^{N} S_n$ multiple access resources in total. Each multiple access resource corresponds to one identifier, and values of identifiers of the $\Sigma_{n=1}^{N} S_n$ multiple access resources are $(0, 1, K, \Sigma_{n=1}^{N} S_n - 1)$. It is assumed that the terminal uses the $m^{th}$ signature of the $k^{th}$ time-frequency resource to transmit the uplink data, and an identifier $n_{MAR}$ of a target time-frequency resource is:

$$n_{MAR} = \begin{cases} \sum_{n=1}^{k-1} S_n + m - 1 & N \ge k > 1 \\ m - 1 & k = 1 \end{cases} \quad \text{(Formula 1-0)}$$

N, n, m, and k each are a positive integer. After the terminal determines the identifier of the target multiple access resource, the identifier of the target multiple access resource may be considered as a factor for calculating a scrambling sequence. For example, an initial sequence generation value $C_{init}$ is first calculated based on the identifier of the target multiple access resource (it may be understood that a scrambling sequence is a Gold sequence generated by using two m sequences, and the initial sequence generation value $C_{init}$ is an initial value of the second m sequence in the two m sequences), and then the scrambling sequence used to scramble the uplink data is calculated based on the initial sequence generation value $C_{init}$. A calculation formula for the initial sequence generation value $C_{init}$ may be:

$$c_{init} = n_{MAR} \cdot 2^{13} + \lfloor n_s/2 \rfloor \cdot 2^9 + N_{ID}^{cell} \quad \text{(Formula 1-1)}$$

Alternatively, for scrambling performed by a BL/CE user, a calculation formula for the $C_{init}$ of the scrambling sequence may be:

$$c_{init} = n_{MAR} \cdot 2^{14} + q \cdot 2^{13} + \lfloor (j_0+j)N_{acc} \bmod 10 \rfloor \cdot 2^9 + N_{ID}^{cell} \quad \text{(Formula 1-2)}$$

Alternatively, for scrambling on a physical uplink control channel (Physical Uplink Control CHannel, PUCCH) Format 2/3/4/5, a calculation formula for the $C_{init}$ may be:

$$c_{init} = (\lfloor n_s/2 \rfloor + 1) \cdot (2N_{ID}^{cell} + 1) 2^x + n_{MAR} \quad \text{(Formula 1-3)}$$

In formulas 1-1, 1-2, and 1-3, $n_{MAR}$ is the identifier of the target multiple access resource used to transmit the uplink data, q is determined based on a quantity of code words in a subframe, $n_s$ is a quantity of timeslots in a frame, $N_{ID}^{cell}$ is an identifier of a cell in which the terminal is located, $j_0 = \lfloor i_0/N_{acc} \rfloor$, $i_0$ is a subframe sequence number obtained through counting from a first PUSCH subframe to a subframe used for current data transmission, $N_{acc}$ is a preset value indicating a quantity of subframes, j indicates a sequence number of a code block in $N_{acc}$ subframes that needs to be scrambled currently, and x is determined based on a total quantity $\Sigma_{n=1}^{N} S_n$ of the multiple access resources. When there are $N_{MAR} = \Sigma_{n=1}^{N} S_n$ multiple access resources in a time-frequency resource in total, x is a positive integer greater than or equal to $\lceil \log_2 N_{MAR} \rceil$. A larger total quantity $\Sigma_{n=1}^{N} S_n$ of the multiple access resources indicates a larger quantity of bits occupied by the identifier $n_{MAR}$ of the target multiple access resource. Therefore, it may alternatively be considered that x is determined based on a quantity of bits occupied by the identifier $n_{MAR}$ of the target multiple access resource. Optionally, a setting rule of $N_{acc}$ is as follows: When the terminal is a bandwidth-reduced low-complexity or coverage enhanced (bandwidth reduced low complexity and coverage enhancement, BL/CE) user and is configured with a mode CE Mode A (coverage enhancement mode A), $N_{acc} = 1$. When the terminal is a BL/CE user and is configured with a mode CE Mode B (coverage enhancement mode B), if a frame structure type is 1 (namely, a type 1), $N_{acc} = 4$; and if the frame structure type is 2 (namely, a type 2), $N_{acc} = 5$.

Scheme 2: The scrambling sequence is generated based on a pilot used by the terminal to send the uplink data, and when the scrambling sequence is calculated, an identifier of the pilot is used. There may be a plurality of pilots in a communications system, and each of the plurality of pilots has respective identifier. The pilot used when the terminal sends the uplink data is a part of the plurality of pilots. Identifiers of the plurality of pilots are divided in a plurality of manners, and only one of the optional division manners is used herein as an example. Details of embodiments are as follows: It is assumed that the plurality of pilots are $p_1$, $p_2$, K $p_P$, and are P pilots in total. Identifiers of the pilots $p_1$, $p_2$, K $p_P$, are 0,1,K,P−1 respectively. If the pilot used by the terminal to send the uplink data is a pilot $p_m$, an identifier of the pilot $p_m$ is $n_{RS} = m-1$, and both P and m are positive integers. After the terminal determines the identifier $n_{RS}$ of the pilot $p_m$ that needs to be used to send the uplink data, the identifier $n_{RS}$ of the pilot $p_m$ may be considered as a factor for calculating a scrambling sequence. For example, an initial sequence generation value $C_{init}$ is first calculated based on the identifier of the pilot (it may be understood that a scrambling sequence is a Gold sequence generated by using two m sequences, and the initial sequence generation value $C_{init}$ is an initial value of the second m sequence in the two m sequences), and then the scrambling sequence used to scramble the uplink data is calculated based on the initial sequence generation value $C_{init}$. A calculation formula for the initial sequence generation value $C_{init}$ may be:

$$c_{init} = n_{RS} \cdot 2^{13} + \lfloor n_s/2 \rfloor \cdot 2^9 + N_{ID}^{cell} \quad \text{(Formula 2-1)}$$

Alternatively, for scrambling performed by a BL/CE user, a calculation formula for the $C_{init}$ may be:

$$c_{init} = n_{RS} \cdot 2^{14} + q \cdot 2^{13} + \lfloor (j_0 + j) N_{acc} \bmod 10 \rfloor \cdot 2^9 + N_{ID}^{cell} \quad \text{(Formula 2-2)}$$

Alternatively, for scrambling on a PUCCH Format 2/3/4/5, a calculation formula for the $C_{init}$ may be:

$$c_{init} = (\lfloor n_s/2 \rfloor + 1) \cdot (2N_{ID}^{cell} + 1) 2^x + n_{RS} \quad \text{(Formula 2-3)}$$

In the formula 2-1 (namely, formula 1), the formula 2-2 (namely, formula 2), and the formula 2-3 (namely, formula 3), $n_{RS}$ is the identifier of the pilot used by the terminal to send the uplink data, and x is determined based on a total quantity P of pilots. When there are P pilots in total, x is a positive integer greater than or equal to $\lceil \log_2 P \rceil$. A larger total quantity P of the pilots indicates a larger quantity of bits occupied by the identifier $n_{RS}$ of the pilot. Therefore, it may alternatively be considered that x is determined based on a quantity of bits occupied by the identifier $n_{RS}$ of the pilot. Another variable is described above, and details are not described herein again.

Scheme 3: The scrambling sequence is generated based on a frequency domain of the target time-frequency resource and a pilot used by the terminal to send the uplink data, and when the scrambling sequence is generated, an identifier of the frequency domain of the target time-frequency resource and an identifier of the pilot used by the terminal to send the uplink data are used. There may be a plurality of frequency domains in a communications system, and each of the plurality of frequency domains has respective identifier. The frequency domain occupied by the target time-frequency resource is a part of the plurality of frequency domains. There may be a plurality of pilots in the communications system, and each of the plurality of pilots has respective identifier. The pilot used by the terminal to send the uplink data is a part of the plurality of pilots. Identifiers of the plurality of frequency domains and identifiers of the plurality of pilots are divided in a plurality of manners, and only one of the optional division manners is used herein as an example. Details of embodiments are as follows: It is assumed that the plurality of frequency domains are a frequency domain 1, a frequency domain 2, a frequency domain 3, . . . , a frequency domain f, . . . , a frequency domain F−1 and a frequency domain F, and are F frequency domains in total. Identifiers of the frequency domain 1, the frequency domain 2, the frequency domain 3, . . . , the frequency domain f, . . . , the frequency domain F−1 and the frequency domain F are 0,1,K,F−1 respectively. There are $P_f$ pilots on a frequency domain f ($1 \le f \le F$) in total, such as $p_1$, $p_2$,K $p_{P_f}$, and identifiers of the $P_f$ pilots are 0,1, K, $P_f$−1 respectively. It is assumed that the frequency domain occupied by the target time-frequency resource is a frequency domain k of the F frequency domains, and the pilot used by the terminal to send the uplink data is the $m^{th}$ pilot on the frequency domain k. In this case, it may be determined that the identifier of the frequency domain of the target time-frequency resource is $n_{Feq} = k-1$, an identifier of the $m^{th}$ pilot $p_m$ on the frequency domain k is $n_{RS} = m-1$, and F, f, m, and k each are a positive integer. After the terminal determines the identifier $n_{Feq}$ of the frequency domain k of the target time-frequency resource and the identifier $n_{RS}$ of the pilot $p_m$ used on the frequency domain k, the identifier $n_{Feq}$ of the frequency domain k and the identifier $n_{RS}$ of the pilot $p_m$ may be considered as factors for calculating a scrambling sequence. For example, an initial sequence generation value $C_{init}$ is first calculated based on the identifier of the frequency domain of the target time-frequency resource and the identifier of the pilot, and then the scrambling sequence used to scramble the uplink data is calculated based on the initial sequence generation value $C_{init}$. A calculation formula for the initial sequence generation value $C_{init}$ may be:

$$c_{init} = n_{Feq} \cdot 2^x + n_{RS} \cdot 2^{13} + \lfloor n_s/2 \rfloor \cdot 2^9 + N_{ID}^{cell} \quad \text{(Formula 3-1)}$$

Alternatively, for scrambling performed by a BL/CE user, a calculation formula for the $C_{init}$ may be:

$$c_{init} = n_{Feq} \cdot 2^x + n_{RS} \cdot 2^{14} + q \cdot 2^{13} + \lfloor (j_0 + j) N_{acc} \bmod 10 \rfloor \cdot 2^9 + N_{ID}^{cell} \quad \text{(Formula 3-2)}$$

Alternatively, for scrambling on a PUCCH Format 2/3/4/5, a calculation formula for the $C_{init}$ may be:

$$c_{init} = (\lfloor n_s/2 \rfloor + 1) \cdot (2N_{ID}^{cell} + 1) 2^y + n_{Feq} 2^x + n_{RS} \quad \text{(Formula 3-3)}$$

In formulas 3-1, 3-2, and 3-3, $n_{Feq}$ is the identifier of the frequency domain of the target time-frequency resource, $n_{RS}$ is the identifier of the pilot used by the terminal to send the uplink data, and x is determined based on a maximum quantity $P_{max}=\max(P_f)$ of pilots (a maximum quantity of pilots on one of the F frequency domains, which is larger than any maximum quantity of pilots on another frequency domain of the F frequency domains, is the maximum quantity $P_{max}$ of pilots). When there are a maximum of $P_{max}$ pilots on a single frequency domain, x is a positive integer greater than or equal to $\lfloor \log_2 P_{max} \rfloor$. A larger maximum quantity $P_{max}=\max(P_f)$ of pilots indicates a larger quantity of bits occupied by the identifier $n_{RS}$ of the pilot. Therefore, it may alternatively be considered that x is determined based on a quantity of bits occupied by the identifier $n_{RS}$ of the pilot, and y is determined based on x and a total quantity F of frequency domains. When there are F frequency domains, y is a positive integer greater than or equal to $\lfloor \log_2 n_{Feq} \rfloor + x$. A larger total quantity F of frequency domains indicates a larger quantity of bits occupied by the identifier $n_{Feq}$ of the frequency domain. Therefore, it may alternatively be considered that y is determined based on x and the quantity of bits occupied by the identifier $n_{Feq}$ of the frequency domain. Another variable is described above, and details are not described herein again.

Scheme 4: The scrambling sequence is generated based on a frequency domain of the target time-frequency resource and a spread spectrum sequence used by the terminal to send the uplink data, and when the scrambling sequence is generated, an identifier of the frequency domain of the target time-frequency resource and an identifier of the spread spectrum sequence used by the terminal to send the uplink data are used. There may be a plurality of frequency domains in a communications system, and each of the plurality of frequency domains has respective identifier. The frequency domain occupied by the target time-frequency resource is a part of the plurality of frequency domains. There may be a plurality of spread spectrum sequences in the communications system, and each of the plurality of spread spectrum sequences has respective identifier. The spread spectrum sequence used by the terminal to send the uplink data is a part of the plurality of spread spectrum sequences. Identifiers of the plurality of frequency domains and identifiers of the plurality of spread spectrum sequences are divided in a plurality of manners, and only one of the optional division manners is used herein as an example. Details are as follows: It is assumed that the plurality of frequency domains are a frequency domain 1, a frequency domain 2, a frequency domain 3, . . . , a frequency domain f, . . . , a frequency domain F−1 and a frequency domain F, and are F frequency domains in total. Identifiers of the frequency domain 1, the frequency domain 2, the frequency domain 3, . . . , the frequency domain f, . . . , the frequency domain F−1 and the frequency domain F are f(1≤f≤F) respectively. There are L f spread spectrum sequences on a frequency domain f(1≤f≤F) in total, such as $l_1, l_2, K\ l_{L_f}$, and identifiers of the $L_f$ spread spectrum sequences are $0,1,K, L_f − 1$ respectively. It is assumed that the frequency domain occupied by the target time-frequency resource is a frequency domain k of the F frequency domains, and the spread spectrum sequence used by the terminal to send the uplink data is the $m^{th}$ spread spectrum sequence on the frequency domain k. In this case, it may be determined that the identifier of the frequency domain of the target time-frequency resource is $n_{Feq}=k−1$, an identifier of the $m^{th}$ spread spectrum sequence $l_m$ on the frequency domain k is $n_{Seq}=m−1$, and F, f, m, and k each are a positive integer. After the terminal determines the identifier $n_{Seq}$ of the frequency domain k of the target time-frequency resource and the identifier $n_{Seq}$ of the spread spectrum sequence $l_m$ used on the frequency domain k, the identifier $n_{Seq}$ of the frequency domain k and the identifier $n_{Seq}$ of the spread spectrum sequence $l_m$ may be considered as factors for calculating a scrambling sequence. For example, an initial sequence generation value $C_{init}$ is first calculated based on the identifier of the frequency domain of the target time-frequency resource and the identifier of the spread spectrum sequence, and then the scrambling sequence used to scramble the uplink data is calculated based on the initial sequence generation value $C_{init}$. A calculation formula for the initial sequence generation value $C_{init}$ may be:

$$c_{init}=n_{Feq}\cdot 2^x+n_{Seq}\cdot 2^{13}+\lfloor n_s/2 \rfloor \cdot 2^9+N_{ID}^{cell} \quad \text{(Formula 4-1)}$$

Alternatively, for scrambling performed by a BL/CE user, a calculation formula for the $C_{init}$ may be:

$$c_{init}=n_{Feq}\cdot 2^x+n_{Seq}\cdot 2^{14}+q\cdot 2^{13}+\lfloor (j_0+j)N_{acc} \bmod 10 \rfloor \cdot 2^9+N_{ID}^{cell} \quad \text{(Formula 4-2)}$$

Alternatively, for scrambling on a PUCCH Format 2/3/4/5, a calculation formula for the $C_{init}$ may be:

$$c_{init}=(\lfloor n_s/2 \rfloor+1)\cdot(2N_{ID}^{cell}+1)2^y+n_{Feq}2^x+n_{Seq} \quad \text{(Formula 4-3)}$$

In formulas 4-1, 4-2, and 4-3, $n_{Feq}$ is the identifier of the frequency domain of the target time-frequency resource, $n_{Seq}$ is the identifier of the spread spectrum sequence used by the terminal to send the uplink data, and x is determined based on a maximum quantity $L_{max}=\max(L_f)$ of spread spectrum sequences (a maximum quantity of spread spectrum sequences on one of the F frequency domains, which is larger than any maximum quantity of spread spectrum sequences on another frequency domain of the F frequency domains, is the maximum quantity $L_{max}$ of spread spectrum sequences). When there are a maximum of $L_{max}$ spread spectrum sequences on a single frequency domain, x is a positive integer greater than or equal to $\lceil \log_2 L_{max} \rceil$. A larger maximum quantity $L_{max}=\max(L_f)$ of spread spectrum sequences indicates a larger quantity of bits occupied by the identifier $n_{Seq}$ of the spread spectrum sequence. Therefore, it may alternatively be considered that x is determined based on a quantity of bits occupied by the identifier $n_{Seq}$ of the spread spectrum sequence, and y is determined based on x and a total quantity F of frequency domains. When there are F frequency domains, y is a positive integer greater than or equal to $\lceil \log_2 F \rceil + x$. A larger total quantity F of frequency domains indicates a larger quantity of bits occupied by the identifier $n_{Feq}$ of the frequency domain. Therefore, it may alternatively be considered that y is determined based on x and the quantity of bits occupied by the identifier $n_{Feq}$ of the frequency domain. Another variable is described above, and details are not described herein again.

Scheme 5: The scrambling sequence is generated based on a frequency domain of the target time-frequency resource and an interleaving pattern used by the terminal to send the uplink data, and when the scrambling sequence is generated, an identifier of the frequency domain of the target time-frequency resource and an identifier of the interleaving pattern used by the terminal to send the uplink data are used. There may be a plurality of frequency domains in a communications system, and each of the plurality of frequency domains has respective identifier. The frequency domain occupied by the target time-frequency resource is a part of the plurality of frequency domains. There may be a plurality of interleaving patterns in the communications system, and each of the plurality of interleaving patterns has respective identifier. The interleaving pattern used by the terminal to send the uplink data is a part of the plurality of interleaving patterns. Identifiers of the plurality of frequency domains and identifiers of the plurality of interleaving patterns are divided in a plurality of manners, and only one of the optional division manners is used herein as an example. Details are as follows: It is assumed that the plurality of frequency domains are a frequency domain 1, a frequency domain 2, a frequency domain 3, . . . , a frequency domain f, . . . , a frequency domain F–1 and a frequency domain F, and are F frequency domains in total. Identifiers of the frequency domain 1, the frequency domain 2, the frequency domain 3, . . . , the frequency domain f, . . . , the frequency domain F–1 and the frequency domain F are 0,1,K,F–1 respectively. There are $L_f$ interleaving patterns on a frequency domain f(1≤f≤F) in total, such as $l_1, l_2, K\ l_{L_f}$, and identifiers of the $L_f$ interleaving patterns are $0,1,K,\ L_f–1$ respectively. It is assumed that the frequency domain occupied by the target time-frequency resource is a frequency domain k of the F frequency domains, and the interleaving pattern used to send the uplink data is the $m^{th}$ interleaving pattern on the frequency domain k. In this case, it may be determined that the identifier of the frequency domain of the target time-frequency resource is $n_{Feq}=k-1$, an identifier of the $m^{th}$ interleaving pattern $q_m$ is $n_{Seq}=m-1$, and F, f, m, and k each are a positive integer. After the terminal determines the identifier $n_{Feq}$ of the frequency domain k of the target time-frequency resource and the identifier $n_{Seq}$ of the interleaving pattern $q_m$ used on the frequency domain k, the identifier $n_{Feq}$ of the frequency domain k and the identifier $n_{Seq}$ of the interleaving pattern $q_m$ may be considered as factors for calculating a scrambling sequence. For example, an initial sequence generation value $C_{init}$ is first calculated based on the identifier of the frequency domain of the target time-frequency resource and the identifier of the interleaving pattern, and then the scrambling sequence used to scramble the uplink data is calculated based on the initial sequence generation value $C_{init}$. A calculation formula for the initial sequence generation value $C_{init}$ may be:

$$c_{init}=n_{Feq}\cdot 2^x+n_{Seq}\cdot 2^{13}+\lfloor n_s/2\rfloor\cdot 2^9+N_{ID}^{cell} \quad \text{(Formula 5-1)}$$

Alternatively, for scrambling performed by a BL/CE user, a calculation formula for the $C_{init}$ may be:

$$c_{init}=n_{Feq}\cdot 2^x+n_{Seq}\cdot 2^{14}+q\cdot 2^{13}+\lfloor (j_0+j)N_{acc}\ \text{mod}\ 10\rfloor\cdot 2^9+N_{ID}^{cell} \quad \text{(Formula 5-2)}$$

Alternatively, for scrambling on a PUCCH Format 2/3/4/5, a calculation formula for the $C_{init}$ may be:

$$c_{init}=(\lfloor n_s/2\rfloor+1)\cdot(2N_{ID}^{cell}+1)2^y+n_{Feq}2^x+n_{Seq} \quad \text{(Formula 5-3)}$$

In formulas 5-1, 5-2, and 5-3, $n_{Feq}$ is the identifier of the frequency domain of the target time-frequency resource, $n_{Seq}$ is the identifier of the interleaving pattern used to send the uplink data, and x is determined based on a maximum quantity $Q_{max}=\max(Q_f)$ of interleaving patterns (a maximum quantity of interleaving patterns on one of the F frequency domains, which is larger than any maximum quantity of interleaving patterns on another frequency domain of the F frequency domains, is the maximum quantity $Q_{max}$ of interleaving patterns). When there is a maximum of $Q_{max}$ interleaving patterns in a single frequency domain, x is a positive integer greater than or equal to $\lceil \log_2 Q_{max} \rceil$. A larger maximum quantity $Q_{max}=\max(Q_f)$ of interleaving patterns indicates a larger quantity of bits occupied by the identifier $n_{Seq}$ of the interleaving pattern. Therefore, it may alternatively be considered that x is determined based on a quantity of bits occupied by the identifier $n_{Seq}$ of the interleaving pattern, and y is determined based on x and a total quantity F of frequency domains. When there are F frequency domains, y is a positive integer greater than or equal to $\lfloor \log_2 F \rfloor+x$. A larger total quantity F of frequency domains indicates a larger quantity of bits occupied by the identifier $n_{Feq}$ of the frequency domain. Therefore, it may alternatively be considered that y is determined based on x and the quantity of bits occupied by the identifier $n_{Feq}$ of the frequency domain. Another variable is described above, and details are not described herein again.

Step S202: The network device receives the uplink data sent by the terminal.

Specifically, when receiving the uplink data, the network device may detect a time-frequency resource used to transmit the uplink data. Therefore, the network device may determine the target time-frequency resource. If the terminal uses a pilot when sending the uplink data, the network device also detects the pilot used by the terminal to send the uplink data. If the terminal uses a spread spectrum sequence when sending the uplink data, the network device also detects the spread spectrum sequence used by the terminal to send the uplink data. If the terminal uses an interleaving pattern when sending the uplink data, the network device also detects the interleaving pattern used by the terminal to send the uplink data. In other words, a radio resource used by the terminal to send the uplink data is detected by the network device.

In this embodiment of the present invention, because the network device may detect the radio resource used by the terminal to send the uplink data, the network device may also generate, based on the radio resource, a descrambling sequence used to descramble the uplink data. It may be understood that a principle of generating the descrambling sequence is the same as a principle of generating the scrambling sequence, so that it can be ensured that the generated descrambling sequence can successfully descramble the uplink data. For example, the terminal uses the scheme 1 to generate a scrambling sequence, and the network device also uses a principle of the scheme 1 to generate a descrambling sequence; or the terminal uses the scheme 2 to generate a scrambling sequence, and the network device also uses a principle of the scheme 2 to generate a descrambling sequence; or the terminal uses the scheme 3 to generate a scrambling sequence by, and the network device also uses a principle of the scheme 3 to generate a descrambling sequence; or the terminal uses the scheme 4 to generate a scrambling sequence, and the network device also uses a principle of the scheme 4 to generate a descrambling sequence; or the terminal uses of the scheme 5 to generate a scrambling sequence, and the network device also uses a principle of the scheme 5 to generate a descrambling sequence. After generating the descrambling sequence, the network device descrambles the uplink data by using the descrambling sequence.

In the method described in FIG. 2, the scrambling sequence used by the terminal to scramble the uplink data is generated by the terminal based on the radio resource used to send the uplink data, and the network device may also detect the radio resource when receiving the uplink data. Therefore, the network device may also generate, based on the radio resource, the descrambling sequence used to descramble the uplink data. According to this method, it can be ensured that when the network device does not obtain an identifier of the terminal in a cell, the terminal can still scramble the uplink data, and the scrambled uplink data can still be successfully descrambled by the network device.

The methods in the embodiments of the present invention are described in detail above, and apparatuses in the embodiments of the present invention are provided in the following.

Figure 3:
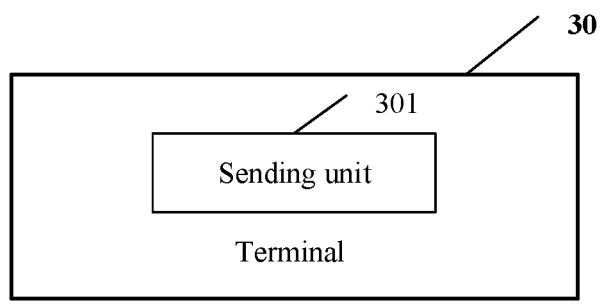
FIG. 3 is a schematic structural diagram of a terminal according to an embodiment of the present invention.

FIG. 3 is a schematic structural diagram of a terminal 30 according to an embodiment of the present invention. The terminal 30 may include a sending unit 301. The sending unit 301 is configured to send uplink data to a network device. The uplink data is scrambled by using a scrambling sequence, and the scrambling sequence is generated based on information about a radio resource used by the terminal to send the uplink data.

It should be noted that for embodiments of implementation of units, refer to corresponding descriptions in the method embodiment shown in FIG. 2.

In the terminal 30 described in FIG. 3, the scrambling sequence used by the terminal to scramble the uplink data is generated by the terminal based on the radio resource used to send the uplink data, and the network device may also detect the radio resource when receiving the uplink data. Therefore, the network device may also generate, based on the radio resource, a descrambling sequence used to descramble the uplink data. According to this method, it can be ensured that when the network device does not obtain an identifier of the terminal in a cell, the terminal can still scramble the uplink data, and the scrambled uplink data can still be successfully descrambled by the network device.

Figure 4:
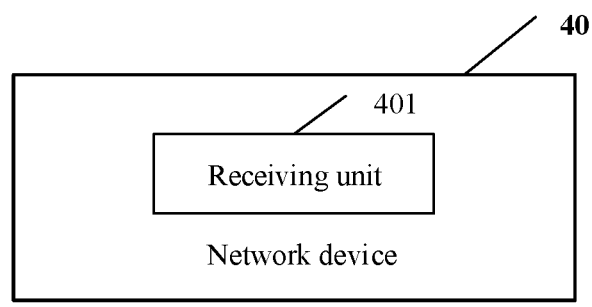
FIG. 4 is a schematic structural diagram of a network device according to an embodiment of the present invention.

FIG. 4 is a schematic structural diagram of a network device 40 according to an embodiment of the present invention. The network device 40 may include a receiving unit 401. The receiving unit 401 is configured to receive uplink data sent by a terminal. The uplink data is scrambled by using a scrambling sequence, and the scrambling sequence is generated based on information about a radio resource used by the terminal to send the uplink data.

It should be noted that for embodiments of implementation of units, refer to corresponding descriptions in the method embodiment shown in FIG. 2.

In the network device 40 described in FIG. 4, the scrambling sequence used by the terminal to scramble the uplink data is generated by the terminal based on the radio resource used to send the uplink data, and the network device may also detect the radio resource when receiving the uplink data. Therefore, the network device may also generate, based on the radio resource, a descrambling sequence used to descramble the uplink data. According to this method, it can be ensured that when the network device does not obtain an identifier of the terminal in a cell, the terminal can still scramble the uplink data, and the scrambled uplink data can still be successfully descrambled by the network device.

Figure 5:
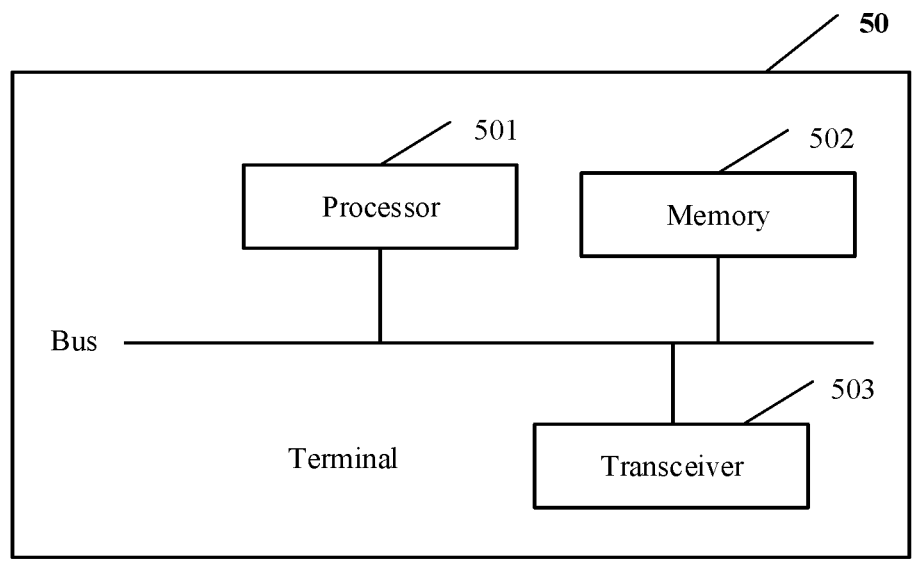
FIG. 5 is a schematic structural diagram of another terminal according to an embodiment of the present invention.

FIG. 5 shows a terminal 50 according to an embodiment of the present invention. The terminal 50 includes a processor 501, a memory 502, and a transceiver 503. The processor 501, the memory 502, and the transceiver 503 are interconnected by using a bus.

The memory 502 includes but is not limited to a random access memory (RAM), a read-only memory (ROM), an erasable programmable read-only memory (EPROM), or a portable read-only memory (e.g., a compact disc read-only memory (CD-ROM)). The memory 502 is configured to a related instruction and related data. The transceiver 503 is configured to receive and send data.

The processor 501 may be one or more central processing units (CPU). When the processor 701 is one CPU, the CPU may be a single-core CPU or a multi-core CPU.

The processor 501 in the terminal 50 is configured to read program code stored in the memory 502, to perform the following operation.

The processor 501 controls the transceiver 503 to send uplink data to a network device. The uplink data is scrambled by using a scrambling sequence, and the scrambling sequence is generated based on information about a radio resource used by the terminal to send the uplink data.

It should be noted that for embodiments of implementation of operations, refer to corresponding descriptions in the method embodiment shown in FIG. 2.

In the terminal 50 described in FIG. 5, the scrambling sequence used by the terminal to scramble the uplink data is generated by the terminal based on the radio resource used to send the uplink data, and the network device may also detect the radio resource when receiving the uplink data. Therefore, the network device may also generate, based on the radio resource, a descrambling sequence used to descramble the uplink data. According to this method, it can be ensured that when the network device does not obtain an identifier of the terminal in a cell, the terminal can still scramble the uplink data, and the scrambled uplink data can still be successfully descrambled by the network device.

Figure 6:
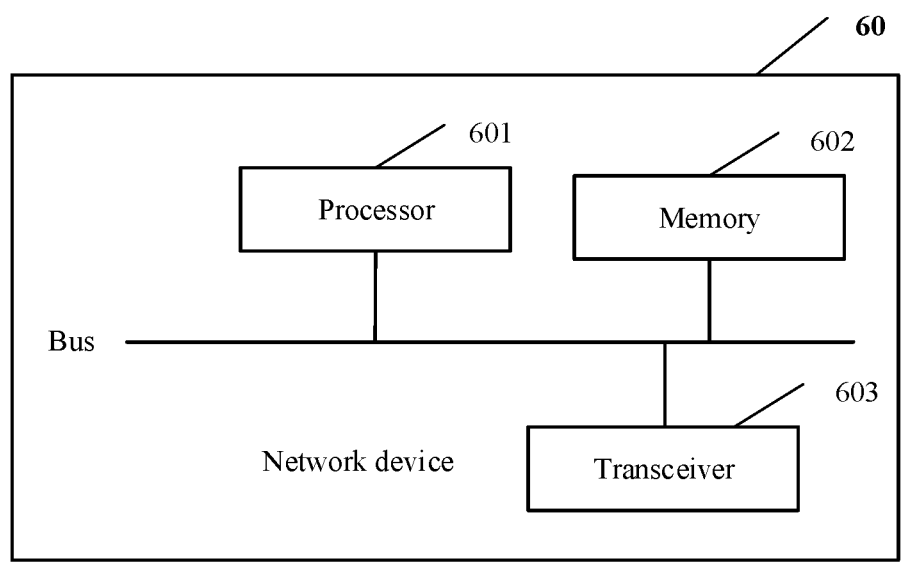
FIG. 6 is a schematic structural diagram of another network device according to an embodiment of the present invention.

FIG. 6 shows a network device 60 according to an embodiment of the present invention. The network device 60 includes a processor 601, a memory 602, and a transceiver 603. The processor 601, the memory 602, and the transceiver 603 are interconnected by using a bus.

The memory 602 includes but is not limited to a RAM, a ROM, an EPROM, or a portable read-only memory. The memory 602 is configured to a related instruction and related data. The transceiver 603 is configured to receive and send data.

The processor 601 may be one or more central processing units CPU. When the processor 701 is one CPU, the CPU may be a single-core CPU or a multi-core CPU.

The processor 601 in the network device 60 is configured to read program code stored in the memory 602, to perform the following operation.

The processor 601 controls the transceiver 603 to receive uplink data sent by a terminal. The uplink data is scrambled by using a scrambling sequence, and the scrambling sequence is generated based on information about a radio resource used by the network device to send the uplink data.

It should be noted that for embodiments of implementation of operations, refer to corresponding descriptions in the method embodiment shown in FIG. 2.

In the device 60 described in FIG. 6, the scrambling sequence used by the terminal to scramble the uplink data is generated by the terminal based on the radio resource used to send the uplink data, and the network device may also detect the radio resource when receiving the uplink data. Therefore, the network device may also generate, based on the radio resource, a descrambling sequence used to descramble the uplink data. According to this method, it can be ensured that when the network device does not obtain an identifier of the terminal in a cell, the terminal can still scramble the uplink data, and the scrambled uplink data can still be successfully descrambled by the network device.

An embodiment of the present invention further provides a chip system. The chip system includes at least one processor, a memory, and an interface circuit. The memory, a transceiver, and the at least one processor are interconnected by using a line. The at least one memory stores an instruction, and when the instruction is executed by the processor, a terminal including the chip system sends uplink data to a network device. The uplink data is scrambled by using a scrambling sequence, and the scrambling sequence is generated based on information about a radio resource used by the terminal to send the uplink data. For details about sending the uplink data by the terminal to the network device, refer to the descriptions in the method embodiment shown in FIG. 2.

An embodiment of the present invention further provides a chip system. The chip system includes at least one processor, a memory, and an interface circuit. The memory, the transceiver, and the at least one processor are interconnected by using a line. The at least one memory stores an instruction, and when the instruction is executed by the processor, a network device including the chip system receives uplink data sent by a terminal. The uplink data is scrambled by using a scrambling sequence, and the scrambling sequence is generated based on information about a radio resource used by the terminal to send the uplink data. For details about receiving, by the network device, the uplink data sent by the terminal, refer to the descriptions in the method embodiment shown in FIG. 2.

An embodiment of the present invention further provides a computer readable storage medium. The computer readable storage medium stores an instruction, and when the instruction is run on a terminal, the terminal sends uplink data to a network device. The uplink data is scrambled by using a scrambling sequence, and the scrambling sequence is generated based on information about a radio resource used by the terminal to send the uplink data. For details about sending the uplink data by the terminal to the network device, refer to the descriptions in the method embodiment shown in FIG. 2.

An embodiment of the present invention further provides a computer readable storage medium. The computer readable storage medium stores an instruction, and when the instruction is run on a network device, the network device receives uplink data sent by a terminal. The uplink data is scrambled by using a scrambling sequence, and the scrambling sequence is generated based on information about a radio resource used by the terminal to send the uplink data. For details about receiving, by the network device, the uplink data sent by the terminal, refer to the descriptions in the method embodiment shown in FIG. 2.

An embodiment of the present invention further provides a computer program product, and when the computer program product is run on a terminal, the terminal sends uplink data to a network device. The uplink data is scrambled by using a scrambling sequence, and the scrambling sequence is generated based on information about a radio resource used by the terminal to send the uplink data. For details about sending the uplink data by the terminal to the network device, refer to the descriptions in the method embodiment shown in FIG. 2.

An embodiment of the present invention further provides a computer program product, and when the computer program product is run on a network device, the network device receives uplink data sent by a terminal. The uplink data is scrambled by using a scrambling sequence, and the scrambling sequence is generated based on information about a radio resource used by the terminal to send the uplink data. For details about receiving, by the network device, the uplink data sent by the terminal, refer to the descriptions in the method embodiment shown in FIG. 2.

In conclusion, in the embodiments of the present invention, the scrambling sequence used by the terminal to scramble the uplink data is generated by the terminal based on the radio resource used to send the uplink data, and the network device may also detect the radio resource when receiving the uplink data. Therefore, the network device may also generate, based on the radio resource, a descrambling sequence used to descramble the uplink data. According to this method, it can be ensured that when the network device does not obtain an identifier of the terminal in a cell, the terminal can still scramble the uplink data, and the scrambled uplink data can still be successfully descrambled by the network device.

A person of ordinary skill in the art may understand that all or some of the processes of the methods in the embodiments may be implemented by instructing relevant hardware by a computer program. The program may be stored in a computer readable storage medium. When the program is executed, the processes of the method embodiments are performed. The foregoing storage medium includes any medium that can store program code, such as a ROM or a random access memory RAM, a magnetic disk or an optical disc.

What is claimed is:

1. A data transmission method, comprising:
generating, by a terminal, a scrambling sequence based on information about a radio resource used by the terminal to send uplink data to a network device; and
sending, by the terminal, the uplink data to the network device, wherein the uplink data is scrambled using the scrambling sequence,
wherein the radio resource comprises a pilot used to send the uplink data, or the radio resource comprises a frequency domain of a time-frequency resource and the pilot, and
wherein when the radio resource comprises the pilot, an initial sequence generation value $C_{init}$ of the scrambling sequence meets a formula 1, a formula 2, or a formula 3, comprising:

$$c_{init}=n_{RS} \cdot 2^{13}+\lfloor n_s/2 \rfloor \cdot 2^9 + N_{ID}^{cell} \quad \text{Formula 1:}$$

$$c_{init}=n_{RS} \cdot 2^{14}+q \cdot 2^{13}+\lfloor (j_0+j)N_{acc} \bmod 10 \rfloor \cdot 2^9 + N_{ID}^{cell} \quad \text{Formula 2:}$$

$$c_{init}=(\lfloor n_s/2 \rfloor +1) \cdot (2N_{ID}^{cell}+1)2^x + n_{RS} \quad \text{Formula 3:}$$

wherein in the formula 1, the formula 2, and the formula 3, $n_{RS}$ is an identifier of the pilot, q is determined based on a quantity of code words in a subframe, $n_s$ is a quantity of timeslots in a frame, $N_{ID}^{cell}$ is an identifier of a cell in which the terminal is located, $j_0=\lfloor i_0/N_{acc} \rfloor$, $i_0$ is a subframe sequence number obtained through counting from a first PUSCH subframe to a subframe used for current data transmission, $N_{acc}$ is a preset value indicating a quantity of subframes, j represents a sequence number of a code block in $N_{acc}$ subframes that needs to be scrambled currently, and x is determined based on a quantity of bits occupied by a number $n_{RS}$ of the pilot.

2. The method according to claim 1, wherein the radio resource comprises at least one of a time-frequency resource used to send the uplink data, the frequency domain of the time-frequency resource, the pilot used to send the uplink data, a spread spectrum sequence used to send the uplink data, and an interleaving pattern used to send the uplink data.

3. The method according to claim 2, wherein the radio resource further comprises:
the time-frequency resource; or
the frequency domain of the time-frequency resource and the spread spectrum sequence; or
the frequency domain of the time-frequency resource and the interleaving pattern.

4. The method according to claim 2, wherein the time-frequency resource used to send the uplink data does not need to be instantly scheduled by the network device.

5. The method according to claim 2, wherein the time-frequency resource used to send the uplink data is selected by the terminal from a plurality of to-be-selected time-frequency resources according to a preset rule, or is preconfigured by the network device for the terminal by using a signaling message.

6. The method according to claim 1, wherein when the radio resource comprises the frequency domain of the time-frequency resource and the pilot, an initial sequence generation value $C_{init}$ of the scrambling sequence meets a formula 4, a formula 5, or a formula 6, comprising:

$$c_{init}=n_{Feq} \cdot 2^x+n_{RS} \cdot 2^{13}+\lfloor n_s/2 \rfloor \cdot 2^9+N_{ID}^{cell} \quad \text{Formula 4:}$$

$$c_{init}=n_{Feq} \cdot 2^x+n_{RS} \cdot 2^{14}+q \cdot 2^{13}+\lfloor (j+j)N_{acc} \bmod 10 \rfloor \cdot 2^9+N_{ID}^{cell} \quad \text{Formula 5:}$$

$$c_{init}=(\lfloor n_s/2 \rfloor+1) \cdot (2N_{ID}^{cell}+1)2^y+n_{Feq}2^x+n_{RS} \quad \text{Formula 6:}$$

wherein in the formula 4, the formula 5, and the formula 6, $n_{Feq}$ is an identifier of the frequency domain, $n_{RS}$ is a number of the pilot, q is determined based on a quantity of code words in a subframe, $n_S$ is a quantity of timeslots in a frame, $N_{ID}^{cell}$ is an identifier of a cell in which the terminal is located, $j_0=\lfloor i_0/N_{acc} \rfloor$, $i_0$ is a subframe sequence number obtained through counting from a first PUSCH subframe to a subframe used for current data transmission, $N_{acc}$ is a preset value indicating a quantity of subframes, j represents a sequence number of a code block in $N_{acc}$ subframes that needs to be scrambled currently, x is determined based on a quantity of bits occupied by the number $n_{RS}$ of the pilot, and y is determined based on x and a quantity of bits occupied by the identifier $n_{Feq}$ of the frequency domain.

7. A terminal, comprising:
a memory;
a transceiver; and
at least one processor, communicatively coupled with the memory and the processor, configured to:
generate a scrambling sequence based on information about a radio resource used by the terminal to send uplink data to a network device, and
send, using the transceiver, the uplink data to the network device, wherein the uplink data is scrambled using the scrambling sequence,
wherein the radio resource comprises a pilot used to send the uplink data, or the radio resource comprises a frequency domain of a time-frequency resource and the pilot, and
wherein when the radio resource comprises the pilot, an initial sequence generation value $C_{init}$ of the scrambling sequence generated by the at least one processor meets a formula 1, a formula 2, or a formula 3, comprising:

$$c_{init}=n_{RS} \cdot 2^{13}+\lfloor n_s/2 \rfloor \cdot 2^9+N_{ID}^{cell} \quad \text{Formula 1:}$$

$$c_{init}=n_{RS} \cdot 2^{14}+q \cdot 2^{13}+\lfloor (j_0+j)N_{acc} \bmod 10 \rfloor \cdot 2^9+N_{ID}^{cell} \quad \text{Formula 2:}$$

$$c_{init}=(\lfloor n_s/2 \rfloor+1) \cdot (2N_{ID}^{cell}+1)2^x+n_{RS} \quad \text{Formula 3:}$$

wherein in the formula 1, the formula 2, and the formula 3, $n_{RS}$ is an identifier of the pilot, q is determined based on a quantity of code words in a subframe, $n_s$ is a quantity of timeslots in a frame, $N_{ID}^{cell}$ is an identifier of a cell in which the terminal is located, $j_0=\lfloor i_0/N_{acc} \rfloor$, $i_0$ is a subframe sequence number obtained through counting from a first PUSCH subframe to a subframe used for current data transmission, $N_{acc}$ is a preset value indicating a quantity of subframes, j represents a sequence number of a code block in $N_{acc}$ subframes that needs to be scrambled currently, and x is determined based on a quantity of bits occupied by a number $n_{RS}$ of the pilot.

8. The terminal according to claim 7, wherein the radio resource comprises at least one of a time-frequency resource used to send the uplink data, the frequency domain of the time-frequency resource, the pilot used to send the uplink data, a spread spectrum sequence used to send the uplink data, and an interleaving pattern used to send the uplink data.

9. The terminal according to claim 8, wherein the radio resource further comprises:
the time-frequency resource; or
the frequency domain of the time-frequency resource and the spread spectrum sequence; or
the frequency domain of the time-frequency resource and the interleaving pattern.

10. The terminal according to claim 8, wherein the time-frequency resource used to send the uplink data does not need to be instantly scheduled by the network device.

11. The terminal according to claim 8, wherein the time-frequency resource used to send the uplink data is selected by the at least one processor from a plurality of to-be-selected time-frequency resources according to a preset rule, or is preconfigured by the network device for the terminal by using a signaling message received by the transceiver.

12. The terminal according to claim 7, wherein when the radio resource comprises the frequency domain of the time-frequency resource and the pilot, an initial sequence generation value $C_{init}$ of the scrambling sequence generated by the at least one processor meets a formula 4, a formula 5, or a formula 6, comprising:

$$c_{init}=n_{Feq} \cdot 2^x+n_{RS} \cdot 2^{13}+\lfloor n_s/2 \rfloor \cdot 2^9+N_{ID}^{cell} \quad \text{Formula 4:}$$

$$c_{init}=n_{Feq} \cdot 2^x+n_{RS} \cdot 2^{14}+q \cdot 2^{13}+\lfloor (j+j)N_{acc} \bmod 10 \rfloor \cdot 2^9+N_{ID}^{cell} \quad \text{Formula 5:}$$

$$c_{init}=(\lfloor n_s/2 \rfloor+1) \cdot (2N_{ID}^{cell}+1)2^y+n_{Feq}2^x+n_{RS} \quad \text{Formula 6:}$$

wherein in the formula 4, the formula 5, and the formula 6, $n_{Feq}$ is an identifier of the frequency domain, $n_{RS}$ is a number of the pilot, q is determined based on a quantity of code words in a subframe, $n_s$ is a quantity of timeslots in a frame, $N_{ID}^{cell}$ is an identifier of a cell in which the terminal is located, $j_0=\lfloor i_0/N_{acc} \rfloor$, $i_0$ is a subframe sequence number obtained through counting from a first PUSCH subframe to a subframe used for current data transmission, $N_{acc}$ is a preset value indicating a quantity of subframes, j represents a sequence number of a code block in $N_{acc}$ subframes that needs to be scrambled currently, x is determined based on a quantity of bits occupied by the number $n_{RS}$ of the pilot, and y is determined based on x and a quantity of bits occupied by the identifier $n_{Feq}$ of the frequency domain.

13. A non-transitory computer readable storage medium, wherein the computer readable storage medium stores an instruction, which when the instruction is executed by at least one processor a terminal, the at least one processor causes the terminal to perform operations,
generating a scrambling sequence based on information about a radio resource used by the terminal to send uplink data to a network device; and
sending the uplink data to the network device, wherein the uplink data is scrambled using the scrambling sequence, wherein the radio resource comprises a pilot used to send the uplink data, or the radio resource comprises a frequency domain of a time-frequency resource and the pilot, and wherein when the radio resource comprises the pilot, an initial sequence generation value $C_{init}$ of the scrambling sequence meets a formula 1, a formula 2, or a formula 3, comprising:

$$c_{init} = n_{RS} \cdot 2^{13} + \lfloor n_s/2 \rfloor \cdot 2^9 + N_{ID}^{cell} \quad \text{Formula 1:}$$

$$c_{init} = n_{RS} \cdot 2^{14} + q \cdot 2^{13} + \lfloor (j_0+j)N_{acc} \bmod 10 \rfloor \cdot 2^9 + N_{ID}^{cell} \quad \text{Formula 2:}$$

$$c_{init} = (\lfloor n_s/2 \rfloor + 1) \cdot (2N_{ID}^{cell} + 1) 2^x + n_{RS} \quad \text{Formula 3:}$$

wherein in the formula 1, the formula 2, and the formula 3, $n_{RS}$ is an identifier of the pilot, q is determined based on a quantity of code words in a subframe, $n_s$ is a quantity of timeslots in a frame, $N_{ID}^{cell}$ is an identifier of a cell in which the terminal is located, $j_0 = \lfloor i_0/N_{acc} \rfloor$, $i_0$ is a subframe sequence number obtained through counting from a first PUSCH subframe to a subframe used for current data transmission, $N_{acc}$ is a preset value indicating a quantity of subframes, j represents a sequence number of a code block in $N_{acc}$ subframes that needs to be scrambled currently, and x is determined based on a quantity of bits occupied by a number $n_{RS}$ of the pilot.

14. The non-transitory computer readable storage medium according to claim 13, wherein the radio resource comprises at least one of a time-frequency resource used to send the uplink data, the frequency domain of the time-frequency resource, the pilot used to send the uplink data, a spread spectrum sequence used to send the uplink data, and an interleaving pattern used to send the uplink data.

15. The non-transitory computer readable storage medium according to claim 14, wherein the radio resource further comprises:

the time-frequency resource; or the frequency domain of the time-frequency resource and the spread spectrum sequence; or the frequency domain of the time-frequency resource and the interleaving pattern.

16. The non-transitory computer readable storage medium according to claim 14, wherein the time-frequency resource used to send the uplink data does not need to be instantly scheduled by the network device.

17. The non-transitory computer readable storage medium according to claim 13, wherein when the radio resource comprises the frequency domain of the time-frequency resource and the pilot, an initial sequence generation value $C_{init}$ of the scrambling sequence meets a formula 4, a formula 5, or a formula 6, comprising:

$$c_{init} = n_{Feq} \cdot 2^x + n_{RS} \cdot 2^{13} + \lfloor n_s/2 \rfloor \cdot 2^9 + N_{ID}^{cell} \quad \text{Formula 4:}$$

$$c_{init} = n_{Feq} \cdot 2^x + n_{RS} \cdot 2^{14} + q \cdot 2^{13} + \lfloor (j+j)N_{acc} \bmod 10 \rfloor \cdot 2^9 + N_{ID}^{cell} \quad \text{Formula 5:}$$

$$c_{init} = (\lfloor n_s/2 \rfloor + 1) \cdot (2N_{ID}^{cell} + 1) 2^y + n_{Feq} 2^x + n_{RS} \quad \text{Formula 6:}$$

wherein in the formula 4, the formula 5, and the formula 6, $n_{Feq}$ is an identifier of the frequency domain, $n_{RS}$ is a number of the pilot, q is determined based on a quantity of code words in a subframe, $n_s$ is a quantity of timeslots in a frame, $N_{ID}^{cell}$ is an identifier of a cell in which the terminal is located, $j_0 = \lfloor i_0/N_{acc} \rfloor$, $i_0$ is a subframe sequence number obtained through counting from a first PUSCH subframe to a subframe used for current data transmission, $N_{acc}$ is a preset value indicating a quantity of subframes, j represents a sequence number of a code block in $N_{acc}$ subframes that needs to be scrambled currently, x is determined based on a quantity of bits occupied by the number $n_{RS}$ of the pilot, and y is determined based on x and a quantity of bits occupied by the identifier $n_{Feq}$ of the frequency domain.

* * * * *